(12) United States Patent
Hoshino

(10) Patent No.: US 9,054,556 B2
(45) Date of Patent: Jun. 9, 2015

(54) POWER SUPPLY DEVICE AND METHOD OF CONTROLLING THE SAME

(75) Inventor: Tomonori Hoshino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 853 days.

(21) Appl. No.: 13/005,818

(22) Filed: Jan. 13, 2011

(65) Prior Publication Data

US 2011/0175452 A1 Jul. 21, 2011

(30) Foreign Application Priority Data

Jan. 21, 2010 (JP) ................................. 2010-011003

(51) Int. Cl.
*H02J 1/10* (2006.01)
*H02J 7/34* (2006.01)
*H02J 9/00* (2006.01)

(52) U.S. Cl.
CPC .. *H02J 7/34* (2013.01); *H02J 9/005* (2013.01)

(58) Field of Classification Search
CPC ........................................................ H02J 1/10
USPC ............................................................ 307/43
See application file for complete search history.

(56) References Cited

U.S. PATENT DOCUMENTS

| 5,631,503 | A * | 5/1997 | Cioffi ............................... 307/66 |
| 6,879,132 | B2 * | 4/2005 | Oki et al. ....................... 320/128 |
| 7,719,252 | B2 * | 5/2010 | Takada et al. ................. 323/299 |

FOREIGN PATENT DOCUMENTS

| JP | 9-44274 | A | | 2/1997 |
| JP | 2000-267741 | A | | 9/2000 |
| JP | 2002062952 | A | | 2/2002 |
| JP | 2004074558 | A | | 3/2004 |
| JP | 2005204437 | A | * | 7/2005 |
| JP | 2007312499 | A | | 11/2007 |
| JP | 2009-159734 | A | | 7/2009 |
| WO | 02061917 | A | | 8/2002 |

OTHER PUBLICATIONS

Japanese Office Action for JP Application No. 2010-011003 mailed on Jul. 10, 2014 with English Translation.

* cited by examiner

*Primary Examiner* — Rexford Barnie
*Assistant Examiner* — Joseph Inge
(74) *Attorney, Agent, or Firm* — Sughrue Mion, PLLC

(57) ABSTRACT

A power supply device includes a power conversion circuit, a secondary battery, and a control circuit. The power conversion circuit converts alternating-current or direct-current power into direct-current power to supply power to a load. The secondary battery is connected between the power conversion circuit and the load and charged with power from the power conversion circuit so that power is supplied to the load when the charging power is discharged. The control circuit controls the power supply device to perform a first operation that, after the charging of the secondary battery, supply of input power into said power conversion circuit is halted and the secondary battery supplies the power accumulated by said charging to said load.

24 Claims, 6 Drawing Sheets

FIG.3

| INPUT POWER | OUTPUT POWER | POWER CONVERSION EFFICIENCY |
|---|---|---|
| 80W | 60W | 75% |
| 150W | 126W | 84% |
| 400W | 360W | 90% |
| 800W | 728W | 91% |
| 1000W | 900W | 90% |

FIG.4

| CHARGING POWER | CHARGING EFFICIENCY |
|---|---|
| 60W | 70% |
| 368W | 80% |
| 668W | 90% |

_US 9,054,556 B2_

POWER SUPPLY DEVICE AND METHOD OF CONTROLLING THE SAME

This application is based upon and claims the benefit of priority from prior Japanese Patent Application No. 2010-011003, filed Jan. 21, 2010, the entire contents of which are incorporated herein.

TECHNICAL FIELD

The present invention relates to a power supply device that uses an AC (Alternating Current)/DC (Direct Current) converter, DC/DC converter or the like and a method of controlling the power supply device.

BACKGROUND ART

In recent years, greater attention has been paid to how businesses are addressing the issues of global warming. There is a greater possibility that companies will set a $CO_2$ emissions reduction target as a management indicator, as well as other possibilities. In this manner, the public interest in how to pay attention to the environment is growing. However, as IT (Information Technology) devices and other devices improve in performance, the IT devices tend to consume much more power. Therefore, there is a pressing need to curb the power consumption of the IT devices.

By the way, in a conventional power supply device, a heavy load comes with high power conversion efficiency, and a light load with low power conversion efficiency. Therefore, a heavy load is not always applied on the power supply device. For example, the problem is that the power loss caused by a power supply device increases in a server or the like where a load is light for a long period of time.

For example, the following is disclosed in PTL1: An AC/DC converter is made small and lightweight by covering a part of the peak-time power with a supply from a secondary battery, and, when the power consumption of a load is small, power is supplied from the secondary battery to the load after the AC/DC converter is stopped The following is disclosed in PTL 2: In an electric device to which a power supply unit such as an AC adapter is connected, with the AC adapter being connected to a system, power is supplied from a battery to the system when the system is switched off or when a load is light.

The following is disclosed in PTL 3: Power is accumulated in a charging unit when the efficiency of a switching power supply (PSU: Power Supply Unit) is high, and, when the efficiency of the PSU is low, power is supplied to a load with the use of the power accumulated in the charging unit.

The following is disclosed in PTL 4: When the remaining capacity of an electric storage device is less than or equal to a predetermined value, a load switches from supplying power to an electronics device to supplying power to a power supply device, and a current supplied from the power supply device is controlled to charge a charging device so that the conversion efficiency of the power supply device is at the highest level.

The following is disclosed in PTL 5: When in operation, an electronics system calculates the power consumption of the electronics system with the use of a direct current generated from an alternating-current power supply, and, when the electronics system starts to operate with the use of the power from a battery, the connection time of the battery is calculated based on the amount of remaining charge in the battery and the value of the power consumption.

CITATION LIST

Patent Literature

{PTL 1} WO 2002/061917
{PTL 2} JP-A-2002-062952
{PTL 3} JP-A-2004-074558
{PTL 4} JP-A-2007-312499
{PTL 5} JP-A-09-044274

SUMMARY OF INVENTION

Technical Problem

Those disclosed in PTLS 1 to 3 have achieved improvements in terms of power loss since power is supplied from a secondary battery (battery) to a load in such cases as when the load is light. However, PTLS 1 to 3 do not refer to a reduction in power with the charging efficiency of the secondary battery taken into account.

In PTL 4, the following is disclosed: When the charging device is charged from the power supply device, the current of the power supply device is so controlled that the conversion efficiency of the power supply device is at the highest level. However, according to PTL 4, all that is taken into account is the conversion efficiency of the power supply device, and the charging efficiency of the secondary battery is not taken into account. The one disclosed in PTL 5 is aimed at supplying power from the battery to the load in such cases as when the power supply is cut off. PTL 5 does not refer to a reduction in power consumption.

An exemplary object of the present invention is to provide a power supply device that can more efficiently reduce power losses by taking into account not only power conversion efficiency but also the charging efficiency of a secondary battery and controlling a power conversion circuit and the charging of a secondary battery.

Solution to Problem

According to a first exemplary aspect of the present invention, there is provided a power supply device that includes: a power conversion circuit that converts alternating-current or direct-current power into direct-current power to supply power to a load; a secondary battery that is connected between the power conversion circuit and the load and charged with power from the power conversion circuit so that power is supplied to the load when the charging power is discharged; a table on which power conversion efficiency of the power conversion circuit associated with output power and charging efficiency of the secondary battery associated with charging power are recorded; and a control circuit that looks up the table to calculate power loss, which is based on the power conversion efficiency of the power conversion circuit associated with the output power in the case where power is supplied from the power conversion circuit to the load, and power loss, which is based on the charging efficiency of the secondary battery associated with the charging power in the case where power is output from the power conversion circuit so that the power conversion efficiency is at the highest level and the secondary battery is charged with extra power that is left after power is supplied to the load, makes a determination, on the basis of both the calculated power losses, as to whether the supply of power from the secondary battery to the load leads to a smaller power loss, makes a determination, when the supply of power from the secondary battery to the load leads to a smaller power loss, as to whether there is a remaining capacity in the secondary battery, and performs a control process, when there is no remaining capacity in the secondary battery, so that power is supplied from the power conversion circuit to the load and the secondary battery is charged for a predetermined period of time.

According to a second exemplary aspect of the present invention, there is provided a method of controlling a power supply device including a power conversion circuit that converts alternating-current or direct-current power into direct-current power to supply power to a load and a secondary battery that is connected between the power conversion circuit and the load and charged with power from the power conversion circuit so that power is supplied to the load when the charging power is discharged, with the control method including the steps of: looking up a table, on which power conversion efficiency of the power conversion circuit associated with output power and charging efficiency of the secondary battery associated with charging power are recorded, to calculate power loss, which is based on the power conversion efficiency of the power conversion circuit associated with the output power in the case where power is supplied from the power conversion circuit to the load, and power loss, which is based on the charging efficiency of the secondary battery associated with the charging power in the case where power is output from the power conversion circuit so that the power conversion efficiency is at the highest level and the secondary battery is charged with extra power that is left after power is supplied to the load; making a determination, on the basis of both the calculated power losses, as to whether the supply of power from the secondary battery to the load leads to a smaller power loss; making a determination, when the supply of power from the secondary battery to the load leads to a smaller power loss, as to whether there is a remaining capacity in the secondary battery; and performing a control process, when there is no remaining capacity in the secondary battery, so that power is supplied from the power conversion circuit to the load and the secondary battery is charged for a predetermined period of time.

Advantageous Effects of Invention

According to an exemplary aspect of the present invention, the supply of power of the power conversion circuit and the charging of the secondary battery are controlled based on the power conversion efficiency of the power conversion circuit and the charging efficiency of the secondary battery. Since the operation takes place in a region where the power conversion efficiency is always high, it is possible to reduce the power loss of the power conversion circuit. Moreover, since it is possible to minimize the power loss during a process of charging the secondary battery, it is possible to reduce the power loss more efficiently.

BRIEF DESCRIPTION OF DRAWINGS

{FIG. 3} A diagram showing a relationship between output power of an AC/DC converter and power conversion efficiency in the power supply device shown in FIG. 1.

{FIG. 4} A diagram showing a relationship between charging power of a secondary battery and charging efficiency in the power supply device shown in FIG. 1.

DESCRIPTION OF EMBODIMENTS

The following describes in detail power supply devices and methods of controlling the power supply devices according to exemplary embodiments of the present invention with reference to the accompanying drawings.

A power supply device of the present exemplary embodiment has a built-in secondary battery, such as a lithium ion battery. The power supply device dynamically calculates gain and loss when the secondary battery is used on the basis of the power conversion efficiency of a power conversion circuit (AC/DC converter or DC/DC converter) and the charging efficiency of the secondary battery. When the "reduction in power consumption associated with an improvement in the power conversion efficiency" exceeds the "loss of power associated with the charging of the secondary battery," power is supplied from the power conversion circuit to a load and the secondary battery is charged. After the secondary battery is charged, an operation of the power conversion circuit is stopped and power is supplied only from the secondary battery to the load. After the secondary battery discharges to a certain level, the secondary battery is charged again.

[First Exemplary Embodiment]

Figure 1:
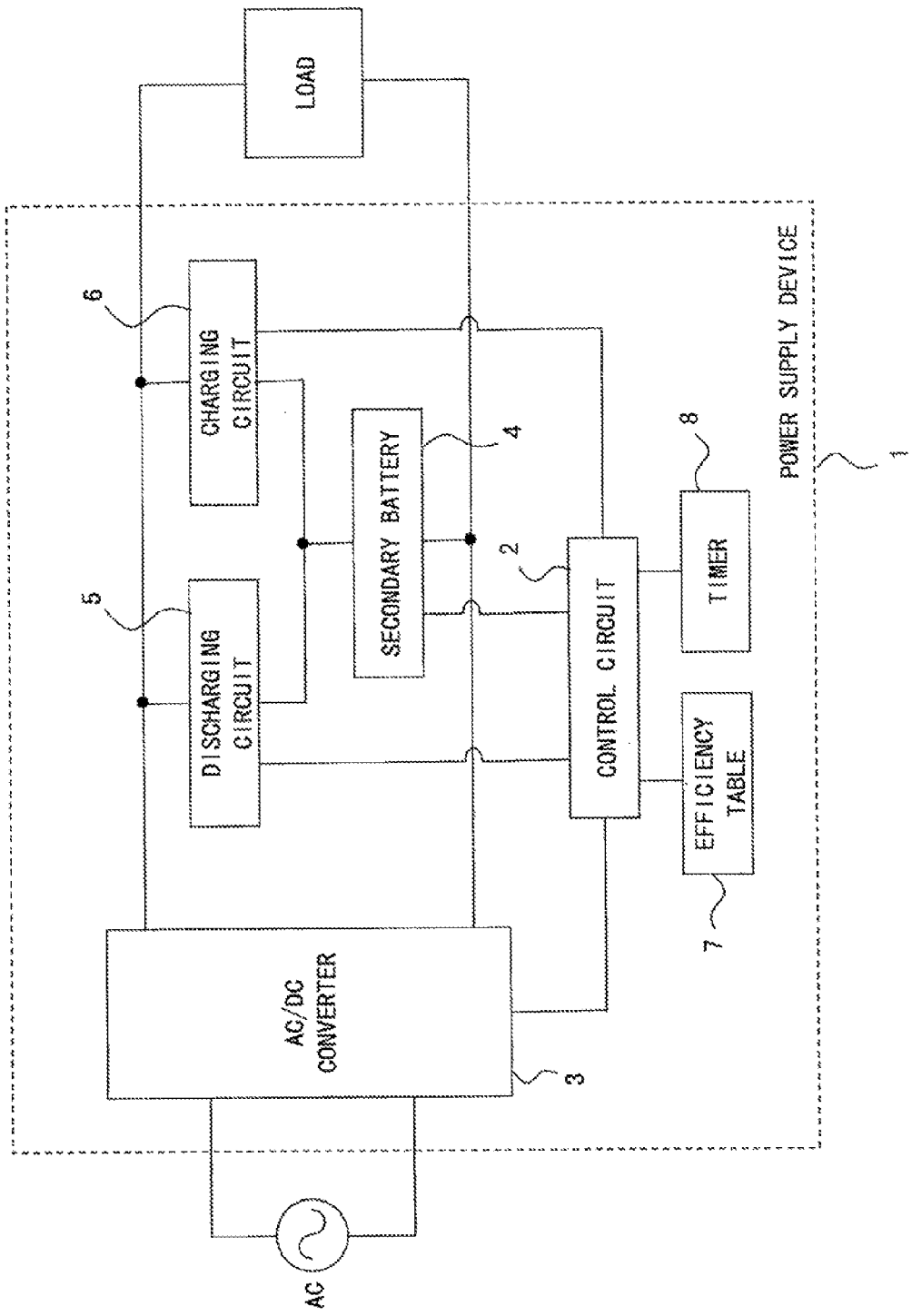
{FIG. 1} A block diagram showing a power supply device according to a first exemplary embodiment of the present invention.

FIG. 1 is a block diagram showing a power supply device according to a first exemplary embodiment of the present invention. The power supply device 1 shown in FIG. 1 is an example of a power supply device that is connected between an AC line and a load to convert alternating-current power, such as commercial power supply, into direct-current power. The power supply device 1 includes a control circuit 2, an AC/DC converter 3, a secondary battery 4, a charging circuit 5, a discharging circuit 6, an efficiency table 7, a timer 8 and the like.

The control circuit 2 is connected to the AC/DC converter 3, the secondary battery 4, the charging circuit 5, the discharging circuit 6, the efficiency table 7 and the timer 8. The control circuit 2 takes control of an operation of each of the above components. The control circuit 2 controls the charging circuit 5 and the discharging circuit 6 in accordance with the states of the AC/DC converter 3 and the secondary battery 4.

The AC/DC converter 3 operates in accordance with a command from the control circuit 2 and thereby converts alternating-current voltage into a direct-current power supply with predetermined voltage level. Therefore, the output voltage is stabilized at a predetermined constant voltage level.

The secondary battery 4 is made up of a lithium ion battery or the like and is connected between the AC/DC converter 3 and the load. The secondary battery 4 is charged with the power supplied from the AC/DC converter 3 via the charging circuit 5. The charging power is discharged via the discharging circuit 6 and the power is supplied to the load.

The charging circuit 5 operates in accordance with a command from the control circuit 2 and thereby uses the power of the AC/DC converter 3 to charge the secondary battery 4.

The discharging circuit 6 operates in accordance with a command from the control circuit 2 and thereby discharges the secondary battery 4 to supply power to the load.

The efficiency table 7 stores in advance a relationship between the output power of the AC/DC converter 3 and the power conversion efficiency as well as a relationship between the charging power of the secondary battery 4 and the charging efficiency.

The timer 8 is used to measure the charging time of the secondary battery 4 as described later.

Figure 2:
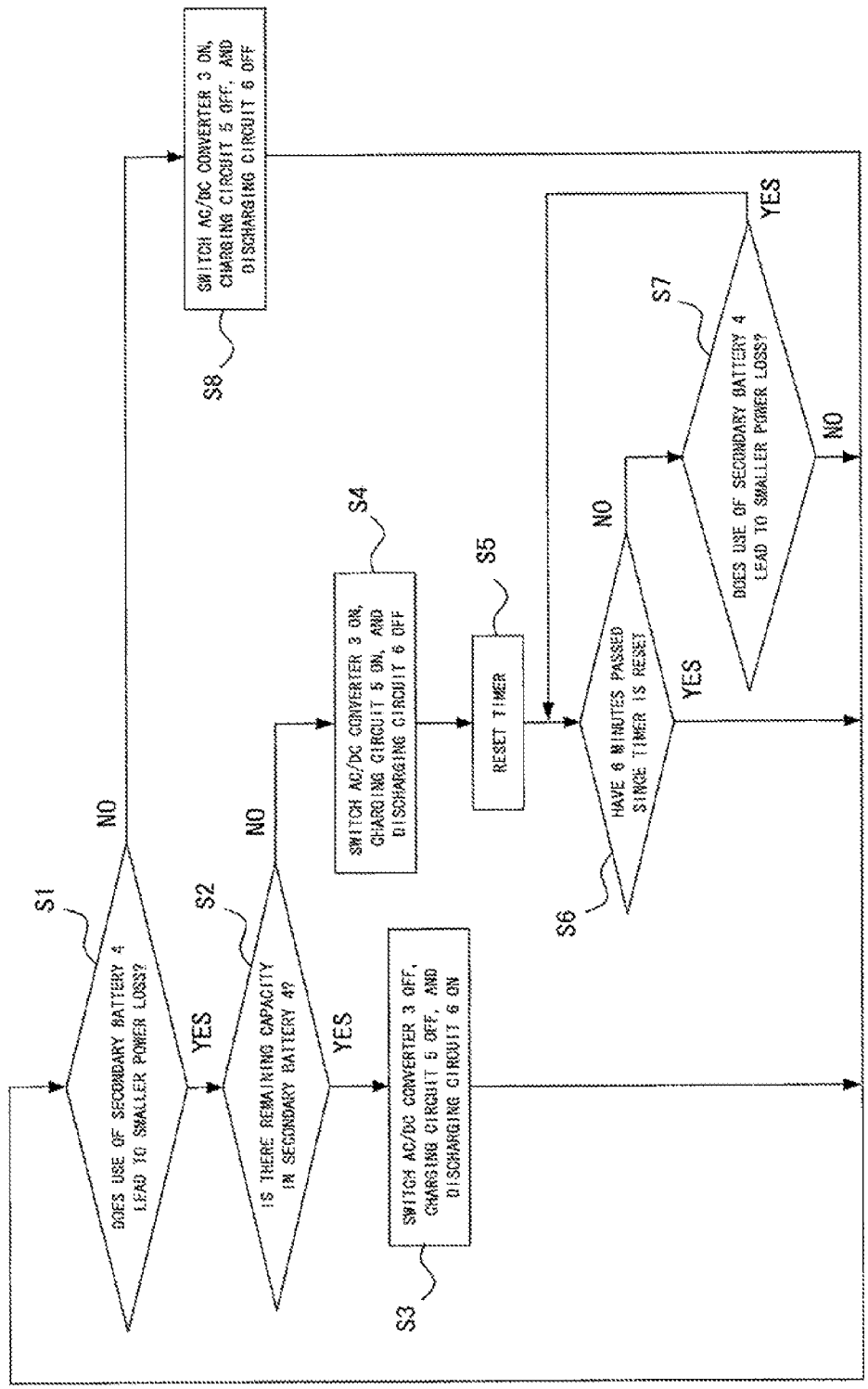
{FIG. 2} A flowchart illustrating an operation of the power supply device shown in FIG. 1.

The following describes an operation of the power supply device 1 shown in FIG. 1, with reference to FIG. 2. A control program, which corresponds to a flowchart shown in FIG. 2, is, for example, set in advance in a storage medium, such as ROM (Read Only Memory), in the control circuit 2, so that the control circuit 2 can execute the control program.

As shown in FIG. 2, first the control circuit 2 acquires the current output power from the AC/DC converter 3. For example, the output current is measured with the use of a resistor having an extremely small resistance value, and the output power is acquired from the above current value and the output voltage. The control circuit 2 calculates the current power conversion efficiency and maximum power conversion efficiency of the AC/DC converter 3 from the efficiency table 7 and makes a determination as to whether the use of the secondary battery 4 makes the power loss smaller than when the secondary battery 4 is not used with the charging efficiency of the secondary battery 4, calculated from the efficiency table 7, taken into account (Step S1). The determination method will be described later in detail with a specific example.

When the results of the determination show that the use of the secondary battery 4 leads to a reduction in the power loss (Step S1: YES), the control circuit 2 then makes a determination as to whether there is a remaining capacity in the secondary battery 4 (Step 2). When there is a remaining capacity in the secondary battery 4 as a result (Step S2: YES), the control circuit 2 then turns the AC/DC converter 3 OFF, the charging circuit 5 OFF, and the discharging circuit 6ON (Step S3). In this manner, the supply of power from the AC/DC converter 3 to the load is stopped; power is supplied from the secondary battery 4 to the load. Then, the process returns to step S1. Incidentally, a threshold value by which whether there is a remaining capacity in the secondary battery 4 is determined is set in advance. For example, the threshold value may be set to zero. As described later, it is desirable that the threshold value be set according to a degradation characteristic of the secondary battery 4.

When there is no remaining capacity in the secondary battery 4 at step S2 (Step S2: NO), the control circuit 2 then turns the AC/DC converter 3ON, the charging circuit 5ON and the discharging circuit 6 OFF (Step S4). In this manner, the AC/DC converter 3 is activated to output power with the highest power conversion efficiency. That is, power is output from the AC/DC converter 3 with the highest power conversion efficiency and is supplied to the load, and the remaining, excess power that is left after being supplied to the load is used to charge the secondary battery 4.

The control circuit 2 then resets the timer 8 (Step S5) and makes a determination as to whether six minutes (one-tenth of one hour) have passed since the timer 8 is reset (Step S6). In this case, the tinier 8 is set to six minutes. However, the present invention is not limited to six minutes; the timer 8 can be set to a given time interval. When six minutes have passed as a result (Step S6: YES), the control circuit 2 returns to the process of step S1. When six minutes have not passed yet (Step S6: NO), the control circuit 2 acquires the current output power from the AC/DC converter 3 and makes, in a similar way to that at step S1, a determination as to whether the use of the secondary battery 4 makes the power loss smaller (Step S7).

When the use of the secondary battery 4 leads to a reduction in the power loss at step S7 (Step S7: YES), the process returns to step S6. On the other hand, when the use, of the secondary battery 4 does not lead to a reduction in the power loss (Step S7: NO), the process returns to step S1.

When the use of the secondary battery 4 does not lead to a reduction in the power loss at step S1 (Step S1: NO), the control circuit 2 turns the AC/DC converter 3 ON, the charging circuit 5 OFF, and the discharging circuit 6 OFF (Step S8). In this manner, an amount of power required for the load is supplied from the AC/DC converter 3 to the load. Then, the process returns to step S1.

Incidentally, after six minutes have passed at step S6 and the secondary battery 4 is charged, the process proceeds to step S2 from step S1. When there is a remaining capacity in the secondary battery 4 at step S2 (Step S2: YES), the control circuit 2 stops the AC/DC converter 3 at step S3 to supply power from the secondary battery 4 to the load. When there is no remaining capacity in the secondary battery 4 at step S2 (Step S2: NO), the process proceeds to step S6 from step S4, and the control circuit 2 activates the AC/DC converter 3 to supply power to the load. With the excess power that is left after being supplied to the load, the secondary battery 4 is charged for six minutes. Then, the operation is repeated.

FIG. 3 shows a relationship between the output power of the AC/DC converter 3 and the power conversion efficiency. FIG. 4 shows a relationship between the charging power of the secondary battery 4 and the charging efficiency. Such information is written to the efficiency table 7. One example of the relationship between the output power and the power conversion efficiency shown in FIG. 3, as well as of the relationship between the charging power and the charging efficiency shown in FIG. 4, is described.

The following describes an advantage of power reductions according to the present exemplary embodiment.

For example, suppose that the load of the power supply device 1 requires a power of 60 W. When the secondary battery 4 is not used, the output power of the AC/DC converter 3 needs to be 60 W. Accordingly, it is necessary that the input power be 80 W as shown in FIG. 3. Therefore, it is clear that the amount of power required per hour is 80 Wh. When the secondary battery 4 is used, first the AC/DC converter 3 outputs a power of 728 W so that the power conversion efficiency is at the highest level. The excess power, 668 W, that is left after the load consumes a power of 60 W is used to charge the secondary battery 4 for six minutes.

In this case, the input power needs to be 800 W as shown in FIG. 3; the amount of power required for six minutes is 800 W×0.1 hour (=six minutes)=80 Wh. At the same time, since the charging efficiency is 90% as shown in FIG. 4, the secondary battery 4 is charged with a power of 668 W× 0.1 hour (=six minutes)×90%=60.12 Wh. Since the amount of power the load consumes is 60 W, it is possible for the load to operate for a period of 60.12 Wh÷60 W=about one hour only with the power of the charged secondary battery 4.

As described above, with a power of 80 Wh, the load can operate for a period of 0.1 hour+1 hour=1.1 hours. Therefore, when the secondary battery 4 is used, the amount of power required per hour is 80 Wh÷1.1 hours=about 72.7 Wh. Thus, if the load requires a power of 60 W, it is determined at step S1 of FIG. 2 that the use of the secondary battery 4 leads to a reduction in the power loss. It is therefore possible to reduce the amount of power per hour by 80 Wh−72.7 Wh=7.3 Wh. It is clear that it is possible to reduce about nine percent of the power consumption of a conventional power supply device.

According to the present exemplary embodiment, the supply of power of the power conversion circuit is controlled based on the power conversion efficiency of the power conversion circuit. Therefore, it is possible to operate in a range where the power conversion efficiency is always high and to reduce the power loss of the power conversion circuit. The charging of the secondary battery is controlled based on the charging efficiency of the secondary battery. Therefore, it is possible to minimize the power loss at the time when the secondary battery is charged and to reduce the power loss more efficiently.

Then, suppose that the load requires a power of 360 W. When the secondary batter 4 is not used, the output power of the AC/DC converter 3 needs to be 360 W. Accordingly, it is necessary that the input power be 400 Was shown in FIG. 3. Therefore, it is clear that the amount of power required per hour is 400 Wh. When the secondary battery 4 is used, first the AC/DC converter 3 supplies a power of 728 W so that the power conversion efficiency is at the highest level. The excess power, 368 W, that is left after the load consumes a power of 360 W is used to charge the secondary battery 4 for six minutes.

In this case, the input power needs to be 800 W as shown in FIG. 3; the amount of power required for six minutes is 800 W×0.1 hour (=six minutes)=80 Wh. At the same time, since the charging efficiency is 80% as shown in FIG. 4, the secondary battery 4 is charged with a power of 368 W×0.1 hour (=six minutes)×80%=29.44 Wh. Since the amount of power the load consumes is 360 W, it is possible for the load to operate for a period of 29.44 Wh 360 W=about 0.08 hour only with the power of the charged secondary battery 4.

As described above, with a power of 80 Wh, the load can operate for a period of 0.1 hour 0.08 hour=0.18 hour. Therefore, when the secondary battery 4 is used, the amount of power required per hour is 80 Wh÷0.11.8 hour=about 444 Wh. Thus, if the load requires a power of 360 W, it is determined at step S1 of FIG. 2 that the use of the secondary battery 4 does not lead to a reduction in the power loss. In this case, the power supply device operates in the same way as a conventional power supply device with the same power consumption.

[Second Exemplary Embodiment]

Figure 5:
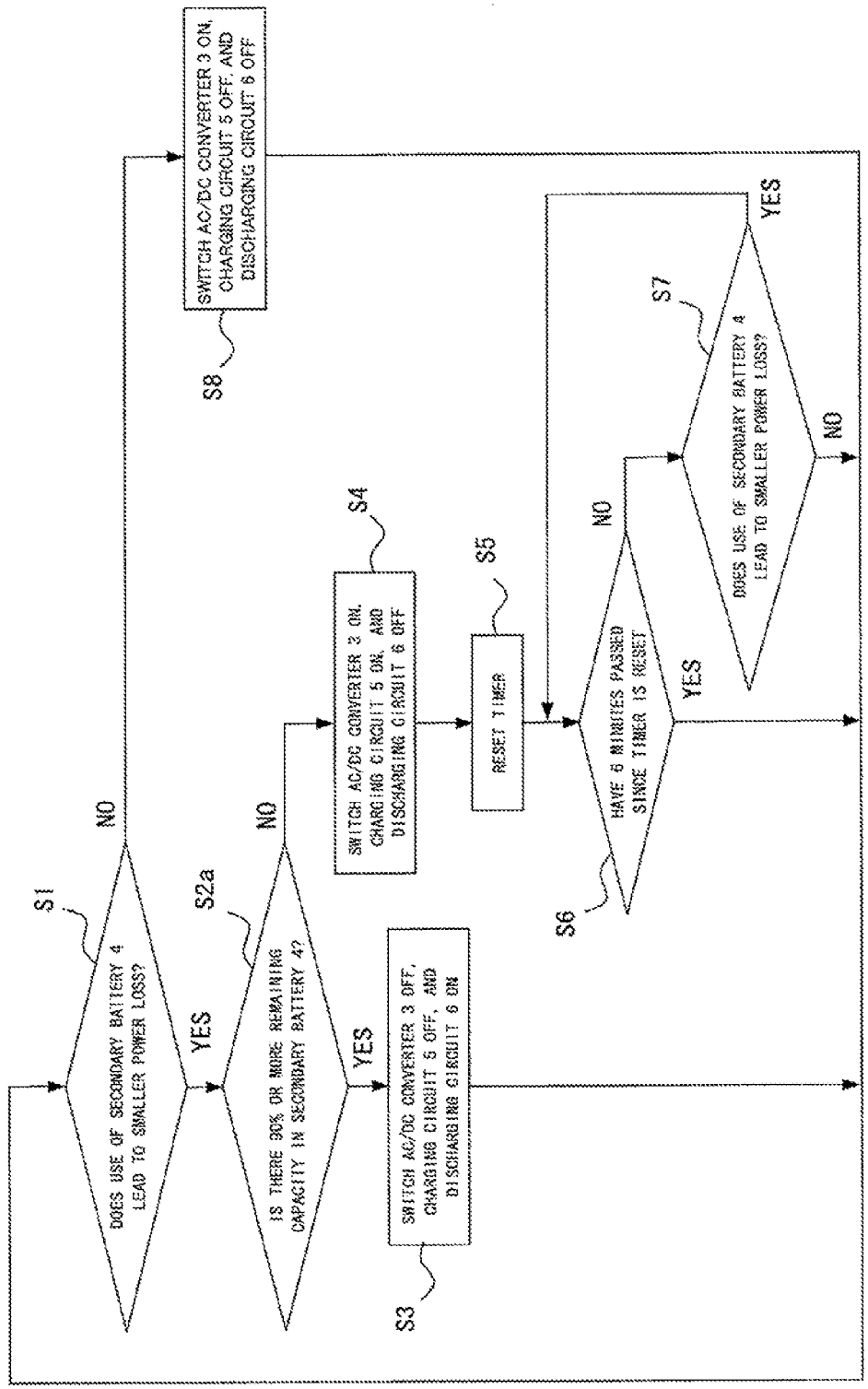
{FIG. 5} A flowchart illustrating an operation of a power supply device according to a second exemplary embodiment of the present invention.

FIG. 5 is a flowchart illustrating an operation of a power supply device according to a second exemplary embodiment of the present invention.

The configuration of a power supply device of the present exemplary embodiment is the same as that shown in FIG. 1. According to the present exemplary embodiment, as shown in FIG. 5, a determination is made at step S2a as to whether the remaining capacity of the secondary battery 4 is greater than or equal to 90%. Therefore, if what is used is a secondary battery, such as lead battery, that has a characteristic of stopping degradation when being used in a region close to full charge, it is possible to increase the life of the secondary battery 4.

Incidentally, at step S2a, the remaining capacity is not limited to 90%. The remaining capacity would depend on the characteristics of the secondary battery. In the case of a lithium ion battery, it is desirable that the remaining capacity be set according to the characteristics of the battery, for example, at 50%. In the case of FIG. 5, the processes except step S2a are the same as those shown in FIG. 2 and therefore will not be described in detail.

[Third Exemplary Embodiment]

Figure 6:
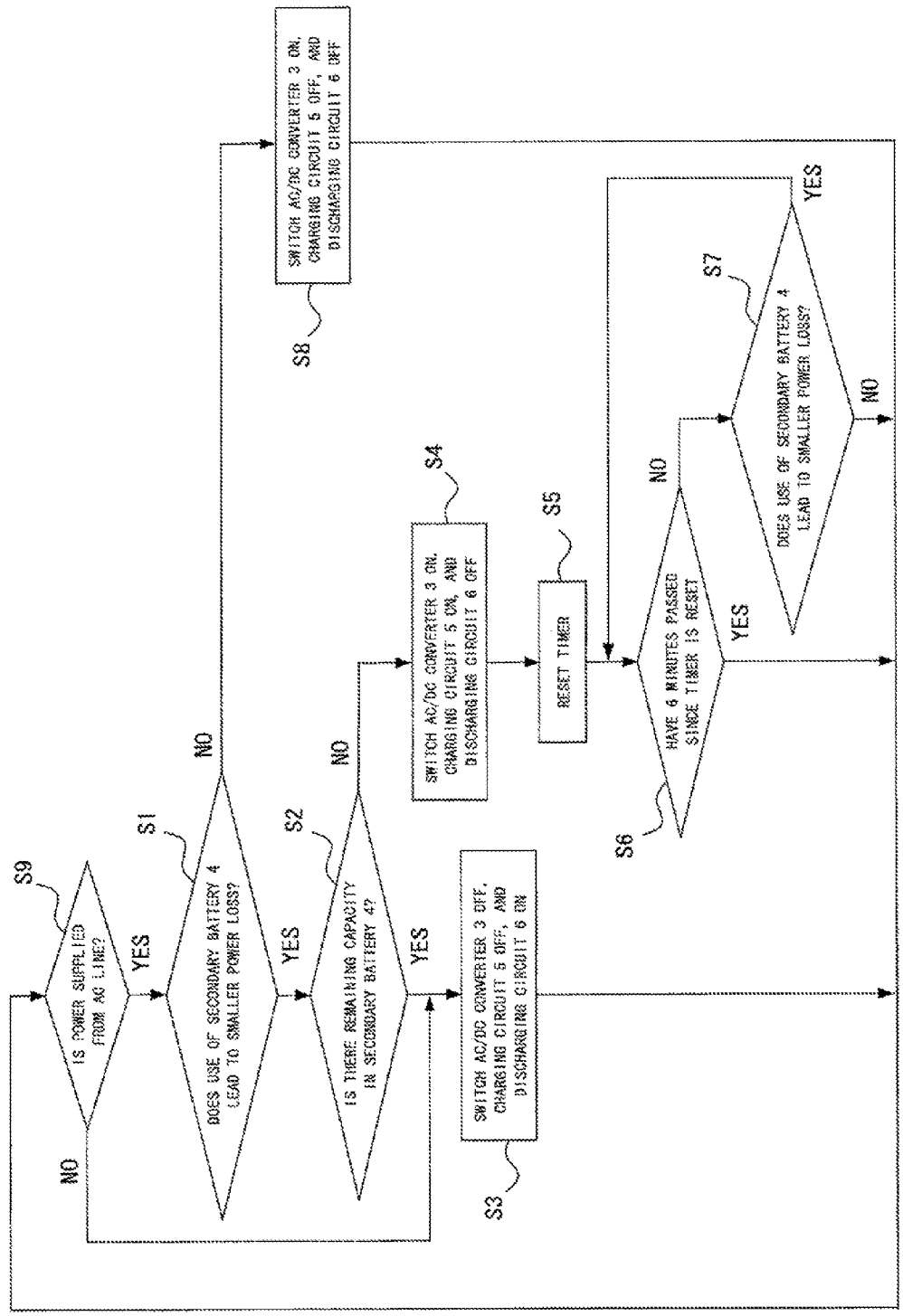
{FIG. 6} A flowchart illustrating an operation of a power supply device according to a third exemplary embodiment of the present invention.

FIG. 6 is a flowchart illustrating an operation of a power supply device according to a third exemplary embodiment of the present invention.

The configuration of a power supply device of the present exemplary embodiment is the same as that shown in FIG. 1. According to the present exemplary embodiment, as shown in FIG. 6, step S9 is added before step S1; a determination is made as to whether power is supplied from the AC line (Step S9). When power is being supplied from the AC line, the process proceeds to step S1. When power is not being supplied from the AC line, the process proceeds to step S3. Therefore, it is possible to add the function of an uninterruptible power supply device. In the case of FIG. 6, the processes except step S9 are the same as those shown in FIG. 2 and therefore will not be described in detail.

[Fourth Exemplary Embodiment]

Figure 7:
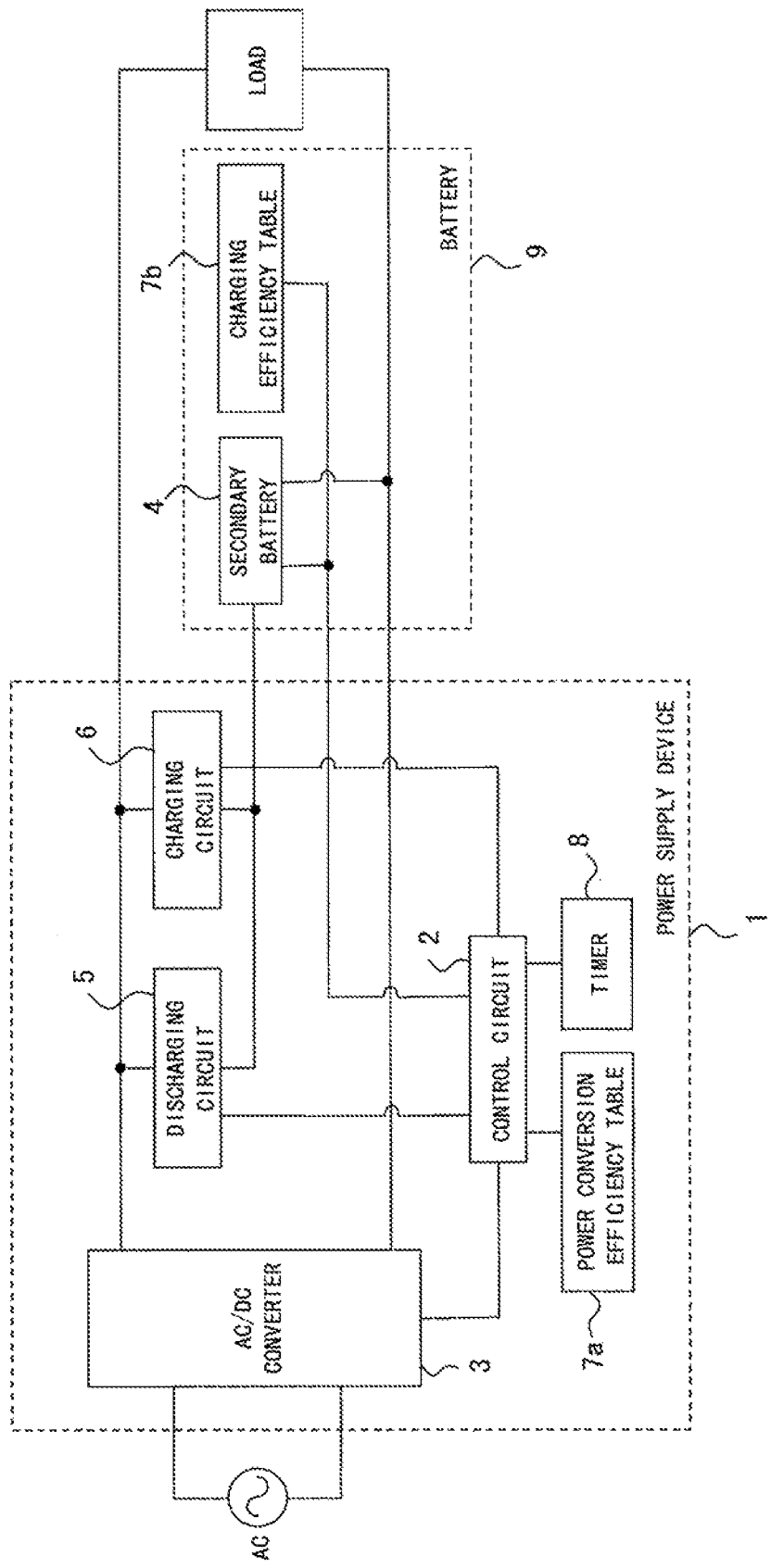
{FIG. 7} A block diagram showing a power supply device according to a fourth exemplary embodiment of the present invention.

FIG. 7 is a block diagram showing a power supply device according to a fourth exemplary embodiment of the present invention.

In FIG. 7, the same components as those shown in FIG. 1 are denoted by the same reference symbols. According to a power supply device of the present exemplary embodiment, as shown in FIG. 7, a power conversion efficiency table 7a, a part of the efficiency table 7 where the power conversion efficiency of the AC/DC converter 3 is recorded, is put in the power supply device 1; the secondary battery 4, as well as a charging efficiency table 7b where the charging efficiency of the secondary battery 4 is recorded, is separated as a battery 9. The charging efficiency table 7b in the battery 9 is read by the control circuit 2.

Given the above configuration, when the power supply device 1 uses various batteries 9 containing secondary batteries 4 that are different in charging efficiency, it is possible for the power supply device 1 to have the charging efficiency table 7b according to the type of the secondary battery 4. Therefore, in the cases of FIGS. 2, 5 and 6, when a determination is made at step S1 as to whether the use of the secondary battery 4 leads to a reduction in the power loss, it is possible to make the determination according to the type of the secondary battery 4.

Incidentally, what is described in the above exemplary embodiments is an example of the AC/DC converter whose input side is connected to the AC line to convert a commercial power supply or the like into direct-current power. However, the present invention may also be applied to a DC/DC converter whose input side is connected to a DC line to convert direct-current power to direct-current power. When the DC/DC converter is used, the same configuration as that of the third exemplary embodiment makes it possible to provide the function of an uninterruptible power supply device.

Up to this point, the present invention has been described with reference to the exemplary embodiment, whereas the present invention is not limited to the foregoing exemplary embodiment. Various modifications understandable to those skilled in the art may be made to the configuration and details of the invention within the scope of the invention.

The whole or part of the exemplary embodiments disclosed above can be described as, but not limited to, the following supplementary notes.

(Supplementary note 1) A power supply device comprising: a power conversion circuit that converts alternating-current or direct-current power into direct-current power to supply power to a load; a secondary battery that is connected between the power conversion circuit and the load and charged with power from the power conversion circuit so that power is supplied to the load when the charging power is discharged; a table on which power conversion efficiency of the power conversion circuit associated with output power and charging efficiency of the secondary battery associated with charging power are recorded; and a control circuit that looks up the table to calculate-power loss, which is based on the power conversion efficiency of the power conversion circuit associated with the output power in the case where power is supplied from the power conversion circuit to the load, and power loss, which is based on the charging efficiency of the secondary battery associated with the charging power in the case where power is output from the power conversion circuit so that the power conversion efficiency is at the highest level and the secondary battery is charged with extra power that is left after power is supplied to the load, makes a determination, on the basis of both the calculated power losses, as to whether the supply of power from the secondary battery to the load leads to a smaller power loss, makes a determination, when the supply of power from the secondary battery to the load leads to a smaller power loss, as to whether there is a remaining capacity in the secondary battery, and performs a control process, when there is no remaining capacity in the secondary battery, so that power is supplied from the power'conversion circuit to the load and the secondary battery is charged for a predetermined period of time.

{Supplementary note 2} The power supply device according to Supplementary note 1, wherein the control circuit performs a control process in a way that stops the power conversion circuit after the secondary battery is charged to supply power from the secondary battery to the load and in a way that activates the power conversion circuit when the remaining capacity of the secondary battery becomes less than or equal to a predetermined value to supply power to the load and charge the secondary battery.

{Supplementary note 3} The power supply device according to Supplementary note 1, wherein the control circuit performs a control process in a way that stops an operation of the power conversion circuit when it is determined that there is a remaining capacity in the secondary battery to supply power to the load only from the secondary battery.

{Supplementary note 4} The power supply device according to Supplementary note 1, wherein the control circuit sets, before a determination is made as to whether there is a remaining capacity in the secondary battery, a threshold value by which whether there is a remaining capacity in the secondary battery is determined according to a degradation characteristic of the secondary battery.

{Supplementary note 5} The power supply device according to Supplementary note 1, wherein the control circuit stops the power conversion circuit when power is not being supplied from an alternating-current or direct-current line to the power conversion circuit to supply power from the secondary battery to the load.

{Supplementary note 6} The power supply device according to Supplementary note 1, wherein: the secondary battery includes various secondary batteries that are different in the charging efficiency; the table includes a power conversion efficiency table where the power conversion efficiency of the power conversion circuit associated with the output power is recorded and a charging efficiency table where the charging efficiency of the secondary battery associated with the charging power is recorded; the secondary battery and the charging efficiency table are provided as a battery in a way that makes it possible to separate the secondary battery and the charging efficiency table from the power supply device; and the control circuit reads the charging efficiency out from the charging efficiency table of the battery in accordance with the type of the secondary battery.

{Supplementary note 7} A method of controlling a power supply device including a power conversion circuit that converts alternating-current or direct-current power into direct-current power to supply power to a load and a secondary battery that is connected between the power conversion circuit and the load and charged with power from the power conversion circuit so that power is supplied to the load when the charging power is discharged, the method comprising: looking up a table, on which power conversion efficiency of the power conversion circuit associated with output power and charging efficiency of the secondary battery associated with charging power are recorded, to calculate power loss, which is based on the power conversion efficiency of the power conversion circuit associated with the output power in the case where power is supplied from the power conversion circuit to the load, and power loss, which is based on the charging efficiency of the secondary battery associated with the charging power in the case where power is output from the power conversion circuit so that the power conversion efficiency is at the highest level and the secondary battery is charged with extra power that is left after power is supplied to the load; making a determination, on the basis of both the calculated power losses, as to whether the supply of power from the secondary battery to the load leads to a smaller power loss; making a determination, when the supply of power from the secondary battery to the load leads to a smaller power loss, as to whether there is a remaining capacity in the secondary battery; and performing a control process, when there is no remaining capacity in the secondary battery, so that power is supplied from the power conversion circuit to the load and the secondary battery is charged for a predetermined period of time.

{Supplementary note 8} The method according to Supplementary note 7, further comprising: performing a control process in a way that stops the power conversion circuit after the secondary battery is charged to supply power from the secondary battery to the load and in a way that activates the power conversion circuit when the remaining capacity of the secondary battery becomes less than or equal to a predetermined value to supply power to the load and charge the secondary battery.

{Supplementary note 9} The method according to Supplementary note 7, further comprising: performing a control process in a way that stops an operation of the power conversion circuit when it is determined that there is a remaining capacity in the secondary battery to supply power to the load only from the secondary battery.

{Supplementary note 10} The method according to Supplementary note 7, further comprising: setting, before a determination is made as to whether there is a remaining capacity in the secondary battery, a threshold value by which whether there is a remaining capacity in the secondary battery is determined according to a degradation characteristic of the secondary battery.

{Supplementary note 11} The method according to Supplementary note 7, further comprising: stopping the power conversion circuit when power is not being supplied from an alternating-current or direct-current line to the power conversion circuit to supply power from the secondary battery to the load.

{Supplementary note 12} The method according to Supplementary note 7, wherein: the secondary battery includes various secondary batteries that are different in the charging efficiency; the table includes a power conversion efficiency table where the power conversion efficiency of the power conversion circuit associated with the output power is recorded and a charging efficiency table where the charging efficiency of the secondary battery associated with the charging power is recorded; and the secondary battery and the charging efficiency table are provided as a battery in a way that makes it possible to separate the secondary battery and the charging efficiency table from the power supply device, the method further comprising: reading the charging efficiency out from the charging efficiency table of the battery in accordance with the type of the secondary battery.

INDUSTRIAL APPLICABILITY

The present invention can be preferably used to save power on a power supply device (AC/DC converter), which converts a commercial power supply or the like, which is used in an IT device, home appliance or the like, into a direct-current power supply, and on a power supply device (DC/DC converter), which converts a direct-current power supply to a direct-current power supply.

REFERENCE SIGNS LIST

1: Power supply device
2: Control circuit
3: AC/DC converter
4: Secondary battery
5: Charging circuit
6: Discharging circuit
7: Efficiency table
8: Timer
9: Battery
7a: Power conversion efficiency table
7b: Charging efficiency table

The invention claimed is:

1. A power supply device for supplying power to a load, comprising:
  a power conversion circuit configured to convert input power into output power;
  a secondary battery; and
  a control means configured to control the power supply device to perform a first operation in which, in a state that said input power is continuously supplied to said power conversion circuit, during a first period that said power conversion circuit receives an input power having an increased input power amount greater than a normal input power amount corresponding to a necessary power for said load, said power conversion circuit is turned on and supplies the necessary power to said load, and said secondary battery is charged by surplus output power of said power conversion circuit, and during a second period, said power conversion circuit is turned off and said secondary battery supplies the power accumulated by said charging to said load, wherein
  said control means compares an average necessary input power amount needed for an operation in which said power conversion circuit supplies power to said load without using said secondary battery with an average necessary input power amount needed for said first operation in consideration of a power conversion efficiency of said power conversion circuit and in further consideration of a charging efficiency of said second battery, and controls the power supply device to perform either of the operations on the basis of the comparison result, and
  said average necessary input power amount needed for an operation in which said power conversion circuit supplies power to said load without using said secondary battery is calculated on the basis of the power conversion efficiency of said power conversion circuit, the power conversion efficiency depending on input power of the power conversion circuit, and said average necessary input power amount needed for said first operation is calculated on the basis of said power conversion efficiency and the charging efficiency of said secondary battery, the charging efficiency depending on charging power.

2. The power supply device according to claim 1, wherein said increased input power amount is an input power amount at which a conversion efficiency of said power conversion circuit is greatest.

3. The power supply device according to claim 1, wherein, said control means controls the power supply device to perform a second operation in which, in a state that said input power is suppliable to said power conversion circuit, said power conversion circuit is supplied with the input power having the normal input power amount, supplies the necessary power to said load, and avoids to charge said secondary battery, and said secondary battery avoids to supply a power to said load, continuously at least in a predetermined period, if an average necessary input power amount is less in the second operation than in the first operation in consideration of a power conversion efficiency of said power conversion circuit, said power conversion efficiency being dependent on an input power to said power conversion circuit, and further in consideration of a power charge efficiency of said second battery, said power charge efficiency being dependent on a charging power of said secondary battery.

4. The power supply device according to claim 1, wherein the operation in the first period operation and the operation in the second period operation are alternately repeated in the state that said input power is continuously supplied to said power conversion circuit.

5. The power supply device according to claim 1, wherein a power conversion efficiency of said power conversion circuit is greater when the power conversion circuit is supplied with said input power having an increased input power amount greater than a normal input power amount than when the power conversion circuit is supplied with the normal input power amount.

6. A power supply device for supplying power to a load, comprising:
  a power conversion circuit configured to convert input power into output power;
  a secondary battery; and
  a control means configured to control the power supply device to perform a first operation in which, in a state that said input power is suppliable to said power conversion circuit, during a first period that said power conversion circuit receives an input power having an increased input power amount greater than a normal input power amount corresponding to a necessary power for said load and supplies the necessary power to said load, said secondary battery is charged by surplus output power of said power conversion circuit, and during a second period, supply of said input power into said power conversion circuit is halted and said secondary battery supplies the power accumulated by said charging to said load,
  wherein said control means comprises a control circuit configured to calculate a first average necessary input power amount and a second average necessary input power amount based on both of power conversion efficiency of said power conversion circuit, the power conversion efficiency depending on input power of the power conversion circuit, and charging efficiency of said secondary battery, the charging efficiency depending on charging power, and, when determining that said first average necessary input power amount is greater than said second average necessary input power amount, to control the power supply device to perform said second operation, said first average necessary input power amount being necessary for a first case in which, in a state that said power conversion circuit continuously receives input power, said power conversion circuit continuously supplies the power to said load, said power conversion circuit continuously supplies no charge to said secondary battery, and said secondary battery continuously supplies no power to said load, and said second average necessary input power amount being necessary for a second case in which, in a predetermined period, in a state that said power conversion circuit receives said input power having the increased input power amount being greater than said first average necessary input power amount, said power conversion circuit supplies the power to said load and simultaneously charges said secondary battery by a surplus output power of said power conversion circuit and said secondary battery supplies no power to said load, and subsequently, in a period from a time at which said predetermined period ends to a time at which a charging amount of said secondary battery by said charging is exhausted, said power conversion circuit supplies no power to said load, said power conversion circuit supplies no charge to said secondary battery, and said secondary battery supplies the power to said load.

7. The power supply device according to claim 6, wherein said increased input power amount greater than said first average necessary input power amount is an input power amount at which conversion efficiency of said power conversion circuit is greatest.

8. The power supply device according to claim 6, wherein, in a case where said control circuit determines that said first average necessary input power amount is less than said second average necessary input power amount, said control circuit controls the power supply device to perform said first operation.

9. The power supply device according to claim 6, wherein, regardless of the comparison result between said first average necessary input power amount and said second average necessary input power amount, in a case where said secondary battery holds a charge greater than a determined amount, said control circuit controls said power conversion circuit to supply no power to said load and controls said secondary battery to supply the power to said load.

10. The power supply device according to claim 6, wherein, said control circuit calculates said first average necessary input power amount and said second average necessary input power during charging of said secondary battery and, when said control circuit determines that calculated said first average necessary input power amount is less than calculated said second average necessary input power amount, said power conversion circuit controls the power supply device to enter the first operation.

11. The power supply device according to claim 6, wherein, in a case that no power is supplied from an alternating-current or direct-current line to the power conversion circuit, said control circuit stops an operation of said power conversion circuit and controls said secondary battery to supply the power to said load.

12. The power supply device according to claim 6, wherein a plurality of secondary batteries that are different in the charging efficiency are used, and said control circuit calculates said respective second necessary input power amounts according to respective types of said plurality of secondary batteries.

13. A method of controlling a power supply device for supplying power to a load comprising a power conversion circuit configured to convert input power into output power, a secondary battery and a control means, the method comprising:
controlling the power supply device to perform a first operation in which, in a state that said input power is continuously supplied to said power conversion circuit, during a first period that said power conversion circuit receives an input power having an increased input power amount greater than a normal input power amount corresponding to a necessary power for said load, said power conversion circuit is turned on and supplies the necessary power to said load, and said secondary battery is charged by surplus output power of said power conversion circuit, and during a second period, said power conversion circuit is turned off and said secondary battery supplies the power accumulated by said charging to said load,
comparing an average necessary input power amount needed for an operation in which said power conversion circuit supplies power to said load without using said secondary battery with an average necessary input power amount needed for said first operation in consideration of a power conversion efficiency of said power conversion circuit and in further consideration of a charging efficiency of said second battery; and
controlling the power supply device to perform either of the operations on the basis of the comparison result, wherein
said average necessary input power amount needed for an operation in which said power conversion circuit supplies power to said load without using said secondary battery is calculated on the basis of the power conversion efficiency of said power conversion circuit, the power conversion efficiency depending on input power of the power conversion circuit, and said average necessary input power amount needed for said first operation is calculated on the basis of said power conversion efficiency and the charging efficiency of said secondary battery, the charging efficiency depending on charging power.

14. The method according to claim 13, wherein said increased input power amount is an input power amount at which a conversion efficiency of said power conversion circuit is greatest.

15. The method according to claim 13, wherein, said control means controls the power supply device to perform a second operation in which, in a state that said input power is suppliable to said power conversion circuit, said power conversion circuit is supplied with the input power having the normal input power amount, supplies the necessary power to said load, and avoids to charge said secondary battery, and said secondary battery avoids to supply a power to said load, continuously at least in a predetermined period, if an average necessary input power amount is less in the second operation than in the first operation in consideration of a power conversion efficiency of said power conversion circuit, said power conversion efficiency being dependent on an input power to said power conversion circuit, and further in consideration of a power charge efficiency of said second battery, said power charge efficiency being dependent on a charging power of said secondary battery.

16. The method according to claim 13, wherein
the operation in the first period operation and the operation in the second period operation are alternately repeated in the state that said input power is continuously supplied to said power conversion circuit.

17. The method according to claim 13, wherein
a power conversion efficiency of said power conversion circuit is greater when the power conversion circuit is supplied with said input power having an increased input power amount greater than a normal input power amount than when the power conversion circuit is supplied with the normal input power amount.

18. A method of controlling a power supply device for supplying power to a load comprising a power conversion circuit configured to convert input power into output power, a secondary battery and a control means, the method comprising:
controlling the power supply device to perform a first operation in which, in a state that said input power is suppliable to said power conversion circuit, during a first period that said power conversion circuit receives an input power having an increased input power amount greater than a normal input power amount corresponding to a necessary power for said load and supplies the necessary power to said load, said secondary battery is charged by surplus output power of said power conversion circuit, and during a second period, supply of said input power into said power conversion circuit is halted and said secondary battery supplies the power accumulated by said charging to said load,
wherein said control means comprises a control circuit configured to calculate a first average necessary input power amount and a second average necessary input power amount based on both of power conversion efficiency of said power conversion circuit, the power conversion efficiency depending on input power of the power conversion circuit, and charging efficiency of said secondary battery, the charging efficiency depending on charging power, and, when determining that said first average necessary input power amount is greater than said second average necessary input power amount, to control the power supply device to perform said second operation, said first average necessary input power amount being necessary for a first case in which, in a state that said power conversion circuit continuously receives input power, said power conversion circuit continuously supplies the power to said load, said power conversion circuit continuously supplies no charge to said secondary battery, and said secondary battery continuously supplies no power to said load, and said second average necessary input power amount being necessary for a second case in which, in a predetermined period, in a state that said power conversion circuit receives said input power having the increased input power amount being greater than said first average necessary input power amount, said power conversion circuit supplies the power to said load and simultaneously charges said secondary battery by a surplus output power of said power conversion circuit and said secondary battery supplies no power to said load, and subsequently, in a period from a time at which said predetermined period ends to a time at which a charging amount of said secondary battery by said charging is exhausted, said power conversion circuit supplies no power to said load, said power conversion circuit supplies no charge to said secondary battery, and said secondary battery supplies the power to said load.

19. The method according to claim 18, wherein said increased input power amount greater than said first average necessary input power amount is an input power amount at which conversion efficiency of said power conversion circuit is greatest.

20. The method according to claim 18, wherein, in a case where said control circuit determines that said first average necessary input power amount is less than said second average necessary input power amount, said control circuit controls the power supply device to perform said first operation.

21. The method according to claim 18, wherein, regardless of the comparison result between said first average necessary input power amount and said second average necessary input power amount, in a case where said secondary battery holds a charge greater than a determined amount, said control circuit controls said power conversion circuit to supply no power to said load and controls said secondary battery to supply the power to said load.

22. The method according to claim 18, further comprising:
calculating said first average necessary input power amount and said second average necessary input power during charging of said secondary battery and, when said control circuit determines that calculated said first average necessary input power amount is less than calculated said second average necessary input power amount, said power conversion circuit controls the power supply device to enter the first operation.

23. The method according to claim 18, wherein, in a case that no power is supplied from an alternating-current or direct-current line to the power conversion circuit, said control circuit stops an operation of said power conversion circuit and controls said secondary battery to supply the power to said load.

24. The method according to claim 18, wherein a plurality of secondary batteries that are different in the charging efficiency are used, and said control circuit calculates said respective second necessary input power amounts according to respective types of said plurality of secondary batteries.

* * * * *